US011270395B2

(12) United States Patent
Senci et al.

(10) Patent No.: US 11,270,395 B2
(45) Date of Patent: Mar. 8, 2022

(54) SYSTEMS AND METHODS FOR BUILDING A DATA TABLE TO REDUCE FALSE DECLINES OVER A NETWORK

(71) Applicant: MasterCard International Incorporated, Purchase, NY (US)

(72) Inventors: David J. Senci, Troy, IL (US); Jason A. Thomas, Troy, IL (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 359 days.

(21) Appl. No.: 15/380,364

(22) Filed: Dec. 15, 2016

(65) Prior Publication Data

US 2018/0174252 A1    Jun. 21, 2018

(51) Int. Cl.
| | |
|---|---|
| *G06Q 50/14* | (2012.01) |
| *G06Q 20/34* | (2012.01) |
| *G06Q 20/40* | (2012.01) |
| *H04L 29/06* | (2006.01) |
| *G06Q 20/38* | (2012.01) |
| *G06Q 20/32* | (2012.01) |

(52) U.S. Cl.
CPC ......... *G06Q 50/14* (2013.01); *G06Q 20/3224* (2013.01); *G06Q 20/34* (2013.01); *G06Q 20/389* (2013.01); *G06Q 20/4014* (2013.01); *G06Q 20/4016* (2013.01); *H04L 63/107* (2013.01)

(58) Field of Classification Search
CPC .... G06Q 50/14; G06Q 20/34; G06Q 20/4014; H04L 63/107
See application file for complete search history.

(56) References Cited

U.S. PATENT DOCUMENTS 5,819,291 A * 10/1998 Haimowitz ......... G06F 16/9014
7,857,212 B1 * 12/2010 Matthews ............ G06Q 20/405
235/380
7,949,559 B2    5/2011 Freiberg
(Continued)

OTHER PUBLICATIONS

"Verver, John, Combatting Purchasing Card and T&E Expense Fraud: Getting Started Guide, ACL Product Strategy & Alliance, 2014, slides 5-8" (Year: 2014).*

*Primary Examiner* — Christopher Bridges
*Assistant Examiner* — Toan Duc Bui
(74) *Attorney, Agent, or Firm* — Armstrong Teasdale LLP

(57) ABSTRACT

A system for building a data table of travel-related data and using the data table to reduce false declines when processing payment transactions is provided. The system includes a travel identifier (TI) computing device configured to receive transaction data that includes travel-related data and cardholder identifiers, the transaction data associated with transactions initiated by a cardholder, identify the travel-related data for the cardholder, and build a data table for storing one or more records within an itinerary data source using the travel-related data. The TI computing device is also configured to receive current transaction data for a current transaction initiated by the cardholder including a current transaction location and a current transaction date. The TI computing device is further configured to authenticate the current transaction data by electronically matching the current transaction location and the current transaction data to the data table stored in the itinerary data source.

21 Claims, 7 Drawing Sheets

(56) References Cited

U.S. PATENT DOCUMENTS

| | | | |
|---|---|---|---|
| 8,166,068 B2 | 4/2012 | Stevens | |
| 8,229,853 B2 | 7/2012 | Dispensa et al. | |
| 8,738,529 B2 | 5/2014 | Kolhatkar et al. | |
| 8,751,398 B2 | 6/2014 | Dispensa et al. | |
| 8,770,477 B2 | 7/2014 | Hefetz | |
| 9,785,940 B2 * | 10/2017 | deOliveira | G06Q 20/385 |
| 2002/0103693 A1 * | 8/2002 | Bayer | G06Q 30/02 |
| 2005/0234773 A1 | 10/2005 | Hirst et al. | |
| 2006/0029200 A1 | 2/2006 | Tasker et al. | |
| 2007/0055589 A1 * | 3/2007 | Jameson | G06Q 40/02 |
| | | | 705/29 |
| 2007/0174082 A1 | 7/2007 | Singh | |
| 2009/0271302 A1 * | 10/2009 | Hamper | G06Q 10/10 |
| | | | 705/30 |
| 2010/0023455 A1 * | 1/2010 | Dispensa | G06Q 10/02 |
| | | | 705/44 |
| 2010/0241535 A1 | 9/2010 | Nightengale et al. | |
| 2010/0268570 A1 * | 10/2010 | Rodriguez | G06Q 10/025 |
| | | | 705/7.13 |
| 2011/0208601 A1 | 8/2011 | Ferguson et al. | |
| 2013/0006822 A1 * | 1/2013 | DePetro | G06Q 20/405 |
| | | | 705/35 |
| 2013/0006823 A1 * | 1/2013 | DePetro | G06Q 20/4016 |
| | | | 705/35 |
| 2013/0006858 A1 * | 1/2013 | DePetro | G06Q 20/3224 |
| | | | 705/44 |
| 2013/0046633 A1 * | 2/2013 | Grigg | G06Q 30/02 |
| | | | 705/14.58 |
| 2013/0046692 A1 * | 2/2013 | Grigg | G06Q 20/4016 |
| | | | 705/44 |
| 2014/0074853 A1 * | 3/2014 | Nath | G06F 16/24539 |
| | | | 707/743 |
| 2014/0278597 A1 * | 9/2014 | Wilkinson | G06Q 10/02 |
| | | | 705/5 |
| 2014/0337062 A1 | 11/2014 | Howe | |
| 2014/0337217 A1 | 11/2014 | Howe et al. | |
| 2014/0379540 A1 * | 12/2014 | Malone | G06Q 20/405 |
| | | | 705/35 |
| 2015/0081349 A1 | 3/2015 | Johndrow et al. | |
| 2015/0324823 A1 * | 11/2015 | Unser | G06Q 30/0205 |
| | | | 705/7.34 |
| 2016/0140562 A1 | 5/2016 | Birukov et al. | |

* cited by examiner

SYSTEMS AND METHODS FOR BUILDING A DATA TABLE TO REDUCE FALSE DECLINES OVER A NETWORK

BACKGROUND OF THE DISCLOSURE

The field of the disclosure relates generally to parsing data messages to identify travel-related data and store a travel schedule within a data table, and more specifically to systems and methods for building a data table of travel-related data, and using the data table to reduce false declines over a network.

At least some known credit/debit card purchases involve fraudulent activity. These fraudulent transactions present liability issues to one or more parties involved in the transaction, such as an issuing bank, a merchant, a payment processing network, or an acquirer bank. As such, these parties are interested in fraud detection, or the ability to analyze the data surrounding a payment card transaction before authorizing the transaction. For example, transactions performed while consumers are traveling, and interacting with new merchants, may overlap with factors associated with payment transaction fraud. This overlap in factors associated with travel and fraud may cause payment transactions to needlessly be declined.

Oftentimes, issuers of payment cards (e.g., credit cards and/or debit cards) rely on a cardholder manually notifying them of the dates and/or locations of their upcoming expected travel. However, given the complexity of coordinating travel, cardholders may neglect to notify issuers, increasing the likelihood of payment transactions being needlessly declined. Further, after a cardholder has begun travelling, the difficulty of contacting the issuer and verifying the travel may be increased. For example, the cardholder may be unsure how to contact the issuer from a foreign location, and/or the issuer may require additional actions from the cardholder to verify travel once in progress. In light of the above limitations in systems to prevent needless travel-related payment declines, an enhanced system that allows for travel information to be automatically identified and recorded is desirable, as such a system could both reduce needless travel-related declines and eliminate an extra step of coordination for travelling cardholders.

BRIEF DESCRIPTION OF THE DISCLOSURE

In one aspect, a system for building a data table of travel-related data and using the data table to reduce false declines when processing payment transactions is provided. The system includes a travel identifier (TI) computing device in communication with a memory. The TI computing device is configured to receive transaction data that includes travel-related data and cardholder identifiers, the transaction data associated with transactions initiated by a cardholder with payments cards associated with payment accounts, identify the travel-related data for the cardholder included within the transaction data, and build a data table for storing one or more records within an itinerary data source using the travel-related data, the data table including at least one location where the cardholder plans to visit, and at least one date when the cardholder plans to visit said at least one location. The TI computing device is also configured to receive current transaction data for a current transaction initiated by the cardholder including a current transaction location and a current transaction date. The TI computing device is further configured to authenticate the current transaction data by electronically matching the current transaction location and the current transaction data to the data table stored in the itinerary data source.

In a second aspect, a computer-implemented method for building a data table of travel-related data and using the data table to reduce false declines when processing payment transactions is provided. The method includes receiving transaction data that includes travel-related data and cardholder identifiers, the transaction data associated with transactions initiated by a cardholder with payments cards associated with payment accounts, identifying the travel-related data for the cardholder included within the transaction data, and building a data table for storing one or more records within an itinerary data source using the travel-related data, the data table including at least one location where the cardholder plans to visit, and at least one date when the cardholder plans to visit said at least one location. The method also includes receiving current transaction data for a current transaction initiated by the cardholder including a current transaction location and a current transaction date. The method further includes authenticating the current transaction data by electronically matching the current transaction location and the current transaction data to the data table stored in the itinerary data source.

In yet another aspect, a non-transitory computer readable medium having computer-executable instructions embodied thereon is provided. When executed by a travel identifier (TI) computing device having one or more processors in communication with one or more memory devices, the computer-executable instructions cause the TI computing device to receive transaction data that includes travel-related data and cardholder identifiers, the transaction data associated with transactions initiated by a cardholder with payments cards associated with payment accounts, identify the travel-related data for the cardholder included within the transaction data, and build a data table for storing one or more records within an itinerary data source using the travel-related data, the data table including at least one location where the cardholder plans to visit, and at least one date when the cardholder plans to visit said at least one location. The computer-executable instructions also cause the TI computing device to receive current transaction data for a current transaction initiated by the cardholder including a current transaction location and a current transaction date. The computer-executable instructions further cause the TI computing device to authenticate the current transaction data by electronically matching the current transaction location and the current transaction data to the data table stored in the itinerary data source.

BRIEF DESCRIPTION OF THE DRAWINGS

FIG. 1 is a schematic diagram illustrating an example multi-party payment processing system for enabling payment-by-card transactions.

FIG. 2 is a simplified block diagram of an example travel identifier (TI) system used for detecting and storing travel-data in accordance with one embodiment of the present disclosure.

FIG. 3 illustrates an example configuration of a user computing device shown in FIG. 2, in accordance with one embodiment of the present disclosure.

FIG. 4 illustrates an example configuration of a server system shown in FIG. 2, in accordance with one embodiment of the present disclosure.

FIG. 5 is a flow chart showing a process for identifying travel-related data and storing a travel schedule within a data table for use in reducing false declines over a network using the system shown in FIG. 2.

FIG. 6 is a diagram of components of one or more example computing devices that may be used in the system shown in FIG. 2.

FIG. 7 illustrates an example configuration of a TI computing device, in accordance with one embodiment of the present disclosure.

DETAILED DESCRIPTION OF THE DISCLOSURE

Figure 1:
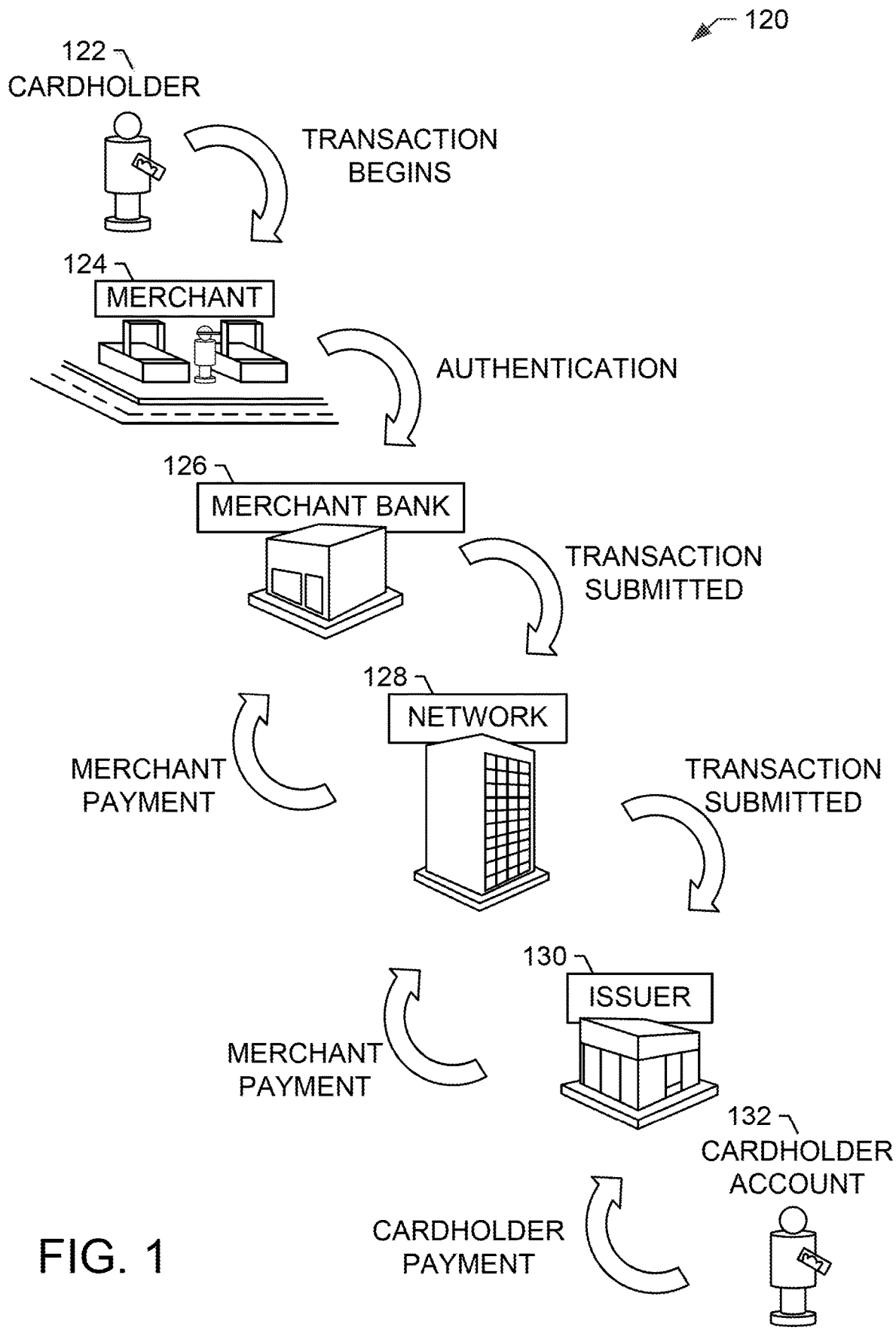
FIGS. 1-7 show example embodiments of the methods and systems described herein.

The following detailed description illustrates embodiments of the disclosure by way of example and not by way of limitation. The description enables one skilled in the art to make and use the disclosure, describes several embodiments, adaptations, variations, alternatives, and uses of the disclosure, including what is presently believed to be the best mode of carrying out the disclosure. The system and methods described herein are configured to automate the notification of issuers and/or merchants of cardholder travel, to reduce needless travel-related payment declines.

The present disclosure relates to a travel identifier (TI) computing system that is configured to receive transaction data from a merchant computing device and identify, from said transaction data, travel-related data, which includes travel-related data, such as travel dates and locations. The TI computing system is also configured to build a data table based on the travel-related data and a cardholder identifier. The TI computing system is further configured to update records (also referred to as itinerary records) in the data table and make them available to risk analyzing parties, including payment card issuers, merchants, and the like.

In at least some embodiments, the TI computing system includes a TI computing device that is in communication with a payment processor computing device. In other embodiments, the TI computing device is integrated into or part of the payment processor computing device.

In certain embodiments, the TI computing device is configured to receive transaction data. The transaction data is associated with a payment transaction, such as a transaction initiated using a payment card account. The transaction data includes, but is not limited to, a transaction identifier, a cardholder identifier, a merchant identifier, a transaction amount, and a transaction status code. The transaction data may be received from and/or generated by a payment processor associated with a payment processing network. The TI computing device is configured to identify the payment transactions that contain travel-related data, which may include, for example, flight reservations, train reservations, and the like. Travel-related data may also include addendum data, such as travel dates, origin location, destination location, and other travel itinerary information.

For the one or more travel-related data contained in the transaction data and/or addendum data received by the TI computing device, the TI computing device is configured to store the travel-related data, such as booking price, payment account identifier, cardholder identifier, booking date, travel dates associated with the booking, origin location(s), destination location(s), and the like.

In other embodiments, the TI computing device is configured to build a data table containing travel-related data in a database, known as an itinerary data source. The TI computing device is also configured to format the travel-related data for storage in the itinerary data source. The itinerary data source stores information including, but not limited to, payment account identifiers, cardholder identifiers, travel dates, and travel locations. Travel dates may include departure date(s), arrival date(s), reservation date(s), booking date(s), and the like. Travel locations may include departure location(s), arrival location(s), layover location(s), intermediate location(s), and the like.

In some embodiments, the TI computing device may receive travel-related data in multiple transactions that may be combined into one data record. For example, the TI computing device may receive two separate transactions related to the same itinerary. The first transaction may be a flight reservation from Atlanta, Ga., to London, England. The second transaction may be a train reservation from London, England, to Paris, France. Additionally, the arrival date of the first transaction may coincide with the departure date of the second transaction. The first transaction, when viewed independently of the second transaction, may indicate England is the destination the cardholder is traveling to. In this example, the TI computing device may combine the itinerary information from the first and second transactions into one data record in the itinerary data source. Paris may be recorded as the arrival location, London may be recorded as an intermediate location, and Atlanta may be recorded as a departure location.

In yet other embodiments, the TI computing device is configured to respond to queries received from risk analyzing parties, including payment card issuers and merchants. For example, a query from a merchant may occur within an authorization process during a transaction initiated at the merchant location. A query from an issuer may be periodic (e.g., every week) and/or during the transaction authorization process. Queries received may include a payment card identifier. Additionally or alternatively, queries received may include a location and/or a date. In some embodiments, queries may contain multiple payment card identifiers, locations, and/or dates. In one example embodiment, where a payment card identifier includes a payment card number, multiple payment card numbers may be specified using a prefix range, such as payment card numbers with the first four digits in the range 1000-1500.

The TI computing device is also configured to receive queries from payment card issuers. Given the overlap between the attributes of travel and fraudulent transactions, payment card issuers may desire additional information when analyzing payment card authorization requests. For example, an issuer may receive a payment card authorization request from a merchant located in Greece. The issuer may query the TI computing device with the payment card identifier included in the authorization request to determine if the associated cardholder has reserved a travel to Greece. A lack of travel reservations may indicate to the issuer that the authorization request is fraudulent. Additionally or alternatively, an issuer may periodically query the TI computing device to maintain independent records of travel itineraries associated with issued payment cards.

In certain embodiments, the TI computing device is configured to receive queries from merchants processing payment card transactions. Given the costs and time of handling fraudulent transactions, merchants may desire additional information before accepting payment cards. For example, a merchant may be presented with a foreign payment card. The merchant may be reluctant to accept a foreign payment card, due to an increased risk that the transaction may later be identified as fraudulent. To mitigate the risk of fraudulent transactions, the merchant may query the TI computing device with a payment card identifier to determine if there are recorded travel reservations to the country or the region where the merchant is located. A lack of travel reservations may indicate to the merchant that the payment card is fraudulent. In some embodiments, the query may be generated automatically and at substantially the same time as a merchant attempts to authorize the payment card.

Two non-limiting examples of queries received by the TI computing device may include: (1) a single payment card identifier, a city, and a specific date, and (2) a range of payment card identifiers specified by the prefix range 1000-1500, the geographic region of Europe, for example, and the range of dates Jan. 1, 2020 to Dec. 1, 2020.

In yet other embodiments, the TI computing device is configured to receive queries that further include delivery frequency (e.g., standing queries). The TI computing device is also configured to process the query repeatedly, in accordance with the query delivery frequency. For example, a query may be received containing multiple payment card identifiers, and a delivery frequency indicating query results should be delivered every 18 hours. In this example, the TI computing device would query the itinerary data source with the included payment card identifiers every 18 hours after receiving the query containing the delivery frequency. The TI computing device may be further configured to receive queries configured to update and/or replace standing queries.

The TI computing device is further configured to retrieve itinerary records from the data table of travel-related data associated with a received query. In some embodiments, the TI computing device may identify records in the data table exactly matching the received query. For example, the zip code "63105" exactly matches "63105" but is not an exact match for the zip code "63130", despite these zip codes corresponding to an overlapping geographic region. In other embodiments, the TI computing device may identify records in the data table matching after symbolic analysis has been performed. In one example, "63105" may be identified as a zip code associated with St. Louis, Mo., and match with the airport tricode "STL". In another example, "DCA" may be identified as an airport tricode, and match with "Washington, D.C." and/or "Arlington, Va.". In yet another example, "500" may be identified as an integer, and match the numeric expression ">400". In some embodiments, the TI computing device may be configured to query a data source containing symbolic matches and/or matching rules.

In some embodiments, the TI computing device is further configured to aggregate itinerary records before responding to a received query. In one embodiment, the TI computing device is configured to respond to queries with the number of matching records in the data table. In another embodiment, the TI computing device is configured to respond to queries with an indication that at least one record matched the query. For example, the TI computing device may respond "traveling" to a query, indicating at least one record in the data table was found for the query.

The TI computing device may provide itinerary records matching a query from a risk analyzing party. In some embodiments, the TI computing device may aggregate and/or anonymize itinerary records before providing such records in a response message. For example, the TI computing device may anonymize records by not including the payment account identifiers in the itinerary records provided in a response message. In one instance, no location information or other identification is returned in a response, but rather an affirmative or negative response indicating travel/no travel (respectively). As another example, the TI computing device may aggregate data by returning the count of records in the data table matching the query.

Itinerary records may be used by risk analyzing parties (e.g. merchants, issuers) to determine if payment transactions should be authorized and/or are fraudulent. Risk analyzing parties may compare itinerary records for a specific payment card account to payment transactions associated with the payment card account. Three non-limiting examples of the application of query results include: (1) an issuer authorizing a payment transaction occurring in a location contained in the cardholder's itinerary records, (2) a merchant cancelling a payment transaction related to the delivery of goods to a location not contained in the cardholder's itinerary records, and (3) a merchant accepting a foreign payment card in a location contained in the cardholder's itinerary records.

In certain embodiments, the TI computing device is configured to provide issuers a cardholder's itinerary records upon building a data table in the itinerary data source. For example, an issuer may opt for a service that allows it to obtain itinerary records of cardholders that would be traveling. In one example, the TI computing device may transmit to the issuer a daily bulk file including the cardholders that may be traveling. The bulk file may include each cardholder's itinerary records.

The TI computing device is further configured to prune records from the data table, including removing records from the data table containing outdated and/or cancelled travel-related data. Two non-limiting examples of records in the data table stored in the itinerary data source that may be pruned by the TI computing device include (1) records containing travel-related data with dates that have passed, and (2) records related to a transaction that has been refunded and/or cancelled. Transactions that have been refunded and/or cancelled may be identified by additional received transaction messages indicating the original transaction was refunded and/or cancelled. For example, a second transaction may be received with a negative amount from a merchant, and further the transaction amount may be opposite to a first transaction with the same merchant. In this example, the second transaction may be identified as a refund of the first transaction, indicating the travel-related data associated with the first transaction should be removed from the itinerary data source. In another example, the TI computing device may receive a transaction message including a status code indicating another transaction identified in the message has been cancelled and should be removed from data table. The TI computing device may prune the data table periodically. Additionally or alternatively, the TI computing device may prune the data table in response to receiving a transaction, such as a cancellation or refund transaction.

In some embodiments, the TI computing device is further configured to accept queries from data analyzing parties (e.g. travel agencies). Then, the TI computing device may transmit to such parties records in data table that have been aggregated and/or anonymized. Data analyzing parties may use aggregated and/or anonymized travel-related data to generate reports, predictions, and/or consumer profiles. For example, a travel agent may query the TI computing device, with the payment card identifier of a cardholder, to research previous cardholder travel data and, based on such data, make travel recommendations to said cardholder.

The methods and system described herein may be implemented using computer programming or engineering techniques including computer software, firmware, hardware, or any combination or subset. As disclosed above, at least one technical problem with prior systems is that there is a need for enhanced fraud detection and the ability to provide more information to the issuer processor to determine whether to approve or deny an online payment transaction. The system and methods described herein address that technical problem. The technical effect of the systems and processes described herein is achieved by performing at least one of the following steps: (a) receive transaction data that includes travel-related data and cardholder identifiers, the transaction data associated with transactions initiated by a cardholder with payments cards associated with payment accounts, (b) identify the travel-related data for the cardholder included within the transaction data, (c) build a data table for storing one or more records within an itinerary data source using the travel-related data, the data table including at least one location where the cardholder plans to visit, and at least one date when the cardholder plans to visit said at least one location, (d) receive, from a merchant computing device, current transaction data for a current transaction initiated by the cardholder including a current transaction location and a current transaction date, and (e) authenticate the current transaction data by electronically matching the current transaction location and the current transaction data to the data table stored in the itinerary data source.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a gift card, and/or any other device that may hold payment account information, such as mobile phones, Smartphones, personal digital assistants (PDAs), key fobs, and/or computers. Each type of transactions card can be used as a method of payment for performing a transaction.

In one embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, Calif.). In yet a further embodiment, the system is run on a Mac OS® environment (Mac OS is a registered trademark of Apple Inc. located in Cupertino, Calif.). The application is flexible and designed to run in various different environments without compromising any major functionality. In some embodiments, the system includes multiple components distributed among a plurality of computing devices. One or more components are in the form of computer-executable instructions embodied in a computer-readable medium. The systems and processes are not limited to the specific embodiments described herein. In addition, components of each system and each process can be practiced independently and separately from other components and processes described herein. Each component and process can also be used in combination with other assembly packages and processes.

In one embodiment, a computer program is provided, and the program is embodied on a computer-readable medium and utilizes a Structured Query Language (SQL) with a client user interface front-end for administration and a web interface for standard user input and reports. In another embodiment, the system is web enabled and is run on a business entity intranet. In yet another embodiment, the system is fully accessed by individuals having an authorized access outside the firewall of the business-entity through the Internet. In a further embodiment, the system is being run in a Windows® environment (Windows is a registered trademark of Microsoft Corporation, Redmond, Wash.). The application is flexible and designed to run in various different environments without compromising any major functionality.

As used herein, an element or step recited in the singular and preceded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the term "database" may refer to either a body of data, a relational database management system (RDBMS), or to both. A database may include any collection of data including hierarchical databases, relational databases, flat file databases, object-relational databases, object oriented databases, and any other structured collection of records or data that is stored in a computer system. The above examples are for example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the system and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

The term processor, as used herein, may refer to central processing units, microprocessors, microcontrollers, reduced instruction set circuits (RISC), application specific integrated circuits (ASIC), logic circuits, and any other circuit or processor capable of executing the functions described herein.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are for example only, and are thus not limiting as to the types of memory usable for storage of a computer program.

FIG. 1 is a schematic diagram illustrating an example multi-party transaction card industry system 120 for enabling payment-by-card transactions in which merchants 124 and card issuers 130 do not need to have a one-to-one relationship. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card or electronic payments account identifier, such as a credit card, to a consumer or cardholder 122, who uses the transaction card to tender payment for a purchase from a merchant 124. To accept payment with the transaction card, merchant 124 must normally establish an account with a financial institution that is part of the financial payment system. This financial institution is usually called the "merchant bank," the "acquiring bank," or the "acquirer." When cardholder 122 tenders payment for a purchase with a transaction card, merchant 124 requests authorization from a merchant bank 126 for the amount of the purchase. The request may be performed over the telephone, but is usually performed through the use of a point-of-sale terminal, which reads cardholder's 122 account information from a magnetic stripe, a chip, or embossed characters on the transaction card and communicates electronically with the transaction processing computers of merchant bank 126. Alternatively, merchant bank 126 may authorize a third party to perform transaction processing on its behalf. In this case, the point-of-sale terminal (POS) will be configured to communicate with the third party. Such a third party is usually called a "merchant processor," an "acquiring processor," or a "third party processor."

Using an interchange network 128, computers of merchant bank 126 or merchant processor will communicate with computers of an issuer bank 130 to determine whether cardholder's 122 account 132 is in good standing and whether the purchase is covered by cardholder's 122 available credit line. Based on these determinations, the request for authorization will be declined or accepted. If the request is accepted, an authorization code is issued to merchant 124.

When a request for authorization is accepted, the available credit line of cardholder's 122 account 132 is decreased. Normally, a charge for a payment card transaction is not posted immediately to cardholder's 122 account 132 because bankcard associations, such as MasterCard International Incorporated®, have promulgated rules that do not allow merchant 124 to charge, or "capture," a transaction until goods are shipped or services are delivered. However, with respect to at least some debit card transactions, a charge may be posted at the time of the transaction. When merchant 124 ships or delivers the goods or services, merchant 124 captures the transaction by, for example, appropriate data entry procedures on the point-of-sale terminal. This may include bundling of approved transactions daily for standard retail purchases. If cardholder 122 cancels a transaction before it is captured, a "void" is generated. If cardholder 122 returns goods after the transaction has been captured, a "credit" is generated. Interchange network 128 and/or issuer bank 130 stores the transaction card information, such as a category of merchant, a merchant identifier, a location where the transaction was completed, amount of purchase, date and time of transaction, in a database 220 (shown in FIG. 2).

After a purchase has been made, a clearing process occurs to transfer additional transaction data related to the purchase among the parties to the transaction, such as merchant bank 126, interchange network 128, and issuer bank 130. More specifically, during and/or after the clearing process, additional data, such as a time of purchase, a merchant name, a type of merchant, purchase information, cardholder account information, a type of transaction, itinerary information, information regarding the purchased item and/or service, and/or other suitable information, is associated with a transaction and transmitted between parties to the transaction as transaction data, and may be stored by any of the parties to the transaction. In the example embodiment, when cardholder 122 purchases travel, such as airfare, a hotel stay, and/or a rental car, at least partial itinerary information is transmitted during the clearance process as transaction data. When interchange network 128 receives the itinerary information, interchange network 128 routes the itinerary information to database 220.

For debit card transactions, when a request for a personal identification number (PIN) authorization is approved by the issuer, cardholder's account 132 is decreased. Normally, a charge is posted immediately to cardholder's account 132. The payment card association then transmits the approval to the acquiring processor for distribution of goods/services or information, or cash in the case of an automated teller machine (ATM).

After a transaction is authorized and cleared, the transaction is settled among merchant 124, merchant bank 126, and issuer bank 130. Settlement refers to the transfer of financial data or funds among merchant's 124 account, merchant bank 126, and issuer bank 130 related to the transaction. Usually, transactions are captured and accumulated into a "batch," which is settled as a group. More specifically, a transaction is typically settled between issuer bank 130 and interchange network 128, and then between interchange network 128 and merchant bank 126, and then between merchant bank 126 and merchant 124.

Figure 2:
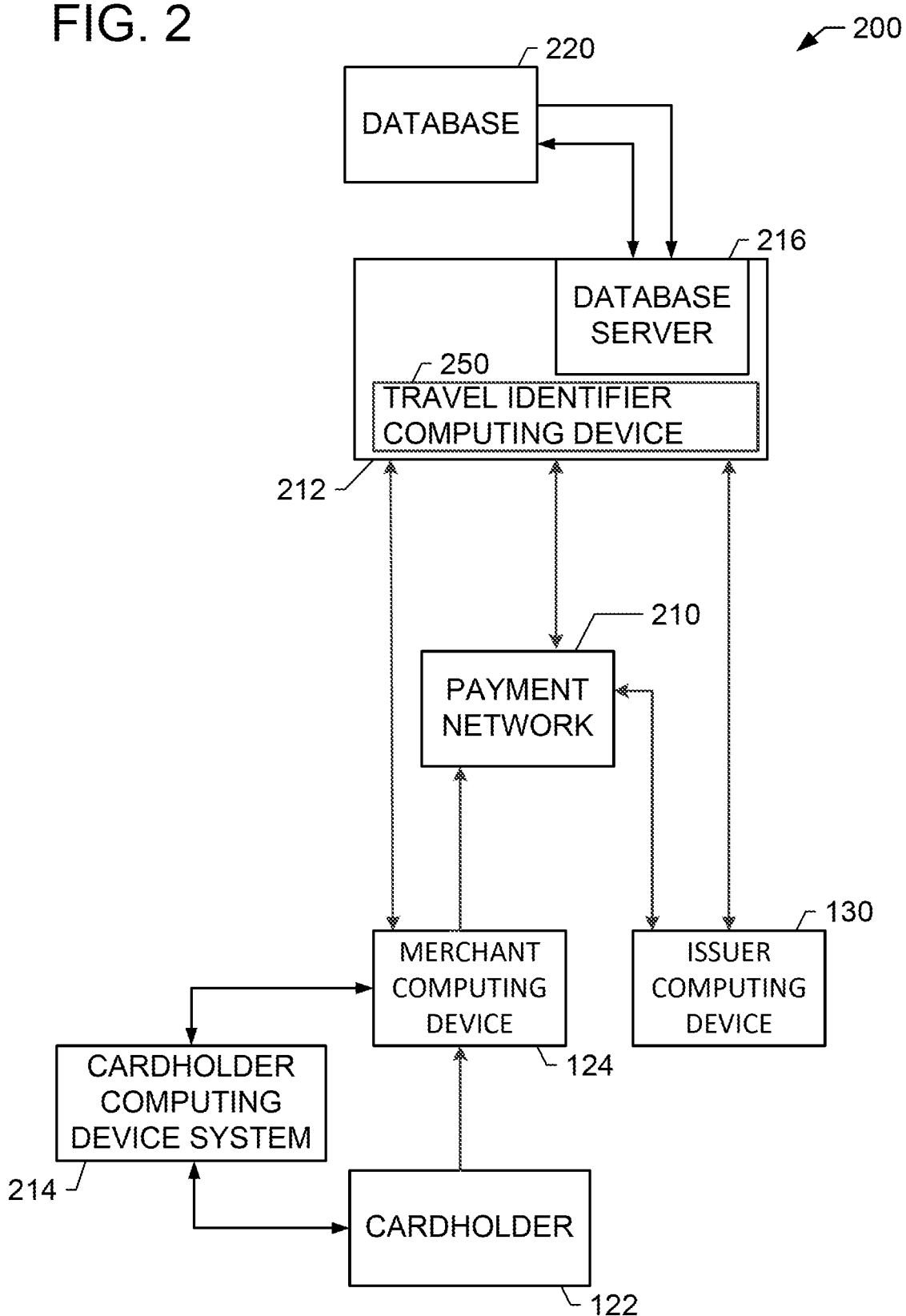

FIG. 2 is a simplified block diagram of an example travel identifier (TI) system 200, in which a variety of computing devices are communicatively coupled to each other via a plurality of network connections. These network connections may be Internet, LAN/WAN, or other connections capable of transmitting data across computing devices. TI system 200 includes travel identifier (TI) computing device 250 and database server 216. In one embodiment, TI computing device 250 and database 216 are components of server system 212. Server system 212 may be a server, a network of multiple computer devices, a virtual computing device, and the like. TI computing device 250 is connected to at least one merchant computing device 124, and an issuer computing device 130 via at least a payment network 210.

In another embodiment, TI computing device 250 is configured to receive transaction data from merchant computing device 124, over payment network 210. As noted with respect to FIG. 1, when a user performs a transaction at a merchant location, transaction data is generated. Transaction data may be transmitted across computing devices as an authorization message. In one embodiment, when a user performs a transaction at merchant computing device 124 associated with a merchant, transaction data for the transaction is transmitted to server system 212. Server system 212 processes the transaction data in the manner described with respect to FIG. 1 and also transmits it to TI computing device 250.

The transaction data may include transaction amount, a transaction date, account data related to the payment card used to perform the transaction (e.g., primary account number associated with payment card, card expiration date, card issuer, card security code, or the like), a merchant identifier, stock-keeping unit (SKU) data relating to the goods or services purchased from the user, and the like. In certain embodiments, the transaction data may also include merchant location. As used herein, merchant location may include address data, city data, state data, zip or postal code data, country data, merchant location identifier data, IP address data, MAC address data, and the like. In other embodiments, the TI computing device is configured to receive transaction data that may include travel-related data. The travel-related data may be part of the addendum data which may include travel dates, origin location, destination location, and other travel itinerary information. TI computing device 250 is also configured to identify travel-related data included in transaction data, store said data in database 220 based on an identifier corresponding to cardholder 122, and build a data table in an itinerary data source associating cardholder 122 with the travel-related data. In some embodiments, TI computing device 250 parses the complete transaction data file searching for, filtering, or otherwise extracting travel-related data. For example, TI computing device 250 may determine after parsing the complete transaction data file that it contains flight itinerary information.

TI computing device 250 is further configured to build the data table by comparing the travel-related data with one or more records in the data table, determining the travel-related data includes at least a portion of data that matches at least one portion of the records in the data table, and add one or more records in the data table with the travel-related data. In certain embodiments, TI computing device 250 parses the complete transaction data file searching for, filtering, or otherwise extracting data that matches the records in the data table. For example, TI computing device 250 may determine, after parsing the complete transaction data file, that cardholder 122 is no longer travelling by identifying a negative transaction amount, a destination location and travel dates that match the records in the data table.

TI computing device 250 is also configured to receive current transaction data for a current transaction initiated by cardholder 122. The current transaction data may include a current transaction location and a current transaction date. Subsequently, TI computing device 250 electronically matches the current transaction location and the current transaction date to the records in the data table in order to authenticate the current transaction data. Once authentication is performed, TI computing device 250 sends an authentication message to the issuer computing device 130 for authorizing the transaction.

Database server 216 is connected to database 220, which contains information on a variety of matters, as described below in greater detail. In one embodiment, database 220 is stored on server system 212 and can be accessed by potential users of server system 212. In an alternative embodiment, database 220 is stored remotely from server system 212 and may be non-centralized. Database 220 may include a single database having separated sections or partitions or may include multiple databases, each being separate from each other. Database 220 may store travel-related data, for each cardholder, in communication with TI computing device 250.

In the example embodiment, TI computing device 250 includes specifically designed computer hardware to perform the steps described herein, and includes specifically designed computer implementation instructions. TI computing device 250 is a specially designed and customized computer device built to perform the specific function of identifying travel-related data from transaction data initiated by cardholder 122 for building a data table of travel-related data (e.g., itinerary information) and using such data table to reduce false declined transactions.

Figure 3:
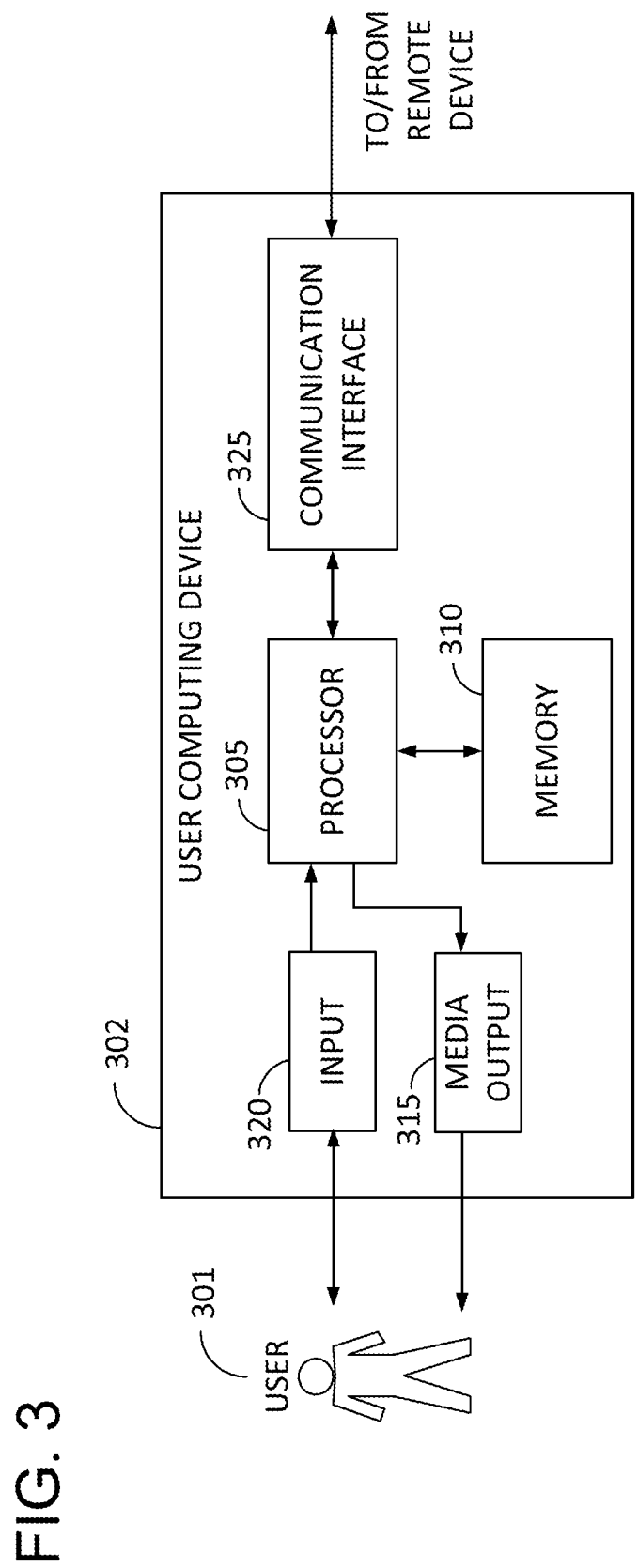

FIG. 3 illustrates an example configuration of a user system, such as cardholder computing device 214 (shown in FIG. 2) configured to transmit data to the TI computing device 250 (shown in FIG. 2). User system 302 may include, but is not limited to, cardholder computing device 214. In the example embodiment, user system 302 includes a processor 305 for executing instructions. In some embodiments, executable instructions are stored in a memory area 310. Processor 305 may include one or more processing units, for example, a multi-core configuration. Memory area 310 is any device allowing information such as executable instructions and/or written works to be stored and retrieved. Memory area 310 may include one or more computer readable media.

User system 302 also includes at least one media output component 315 for presenting information to user 301. User 301 may include, but is not limited to, cardholder 122. Media output component 315 is any component capable of conveying information to user 301. For example, media output component 315 may be a display component configured to display component lifecycle data in the form of reports, dashboards, communications, and the like. In some embodiments, media output component 315 includes an output adapter such as a video adapter and/or an audio adapter. An output adapter is operatively coupled to processor 305 and operatively connectable to an output device such as a display device, a liquid crystal display (LCD), organic light emitting diode (OLED) display, or "electronic ink" display, or an audio output device, a speaker or headphones.

In some embodiments, user system 302 includes an input device 320 for receiving input from user 301. Input device 320 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 315 and input device 320. User system 302 may also include a communication interface 325, which is communicatively connectable to a remote device such as server system 212 (shown in FIG. 2). Communication interface 325 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 310 are, for example, computer readable instructions for providing a user interface to user 301 via media output component 315 and, optionally, receiving and processing input from input device 320. A user interface may include, among other possibilities, a web browser and client application. Web browsers enable users, such as user 301, to display and interact with media and other information typically embedded on a web page or a website from server system 212. A client application allows user 301 to interact with a server application from server system 212.

Figure 4:
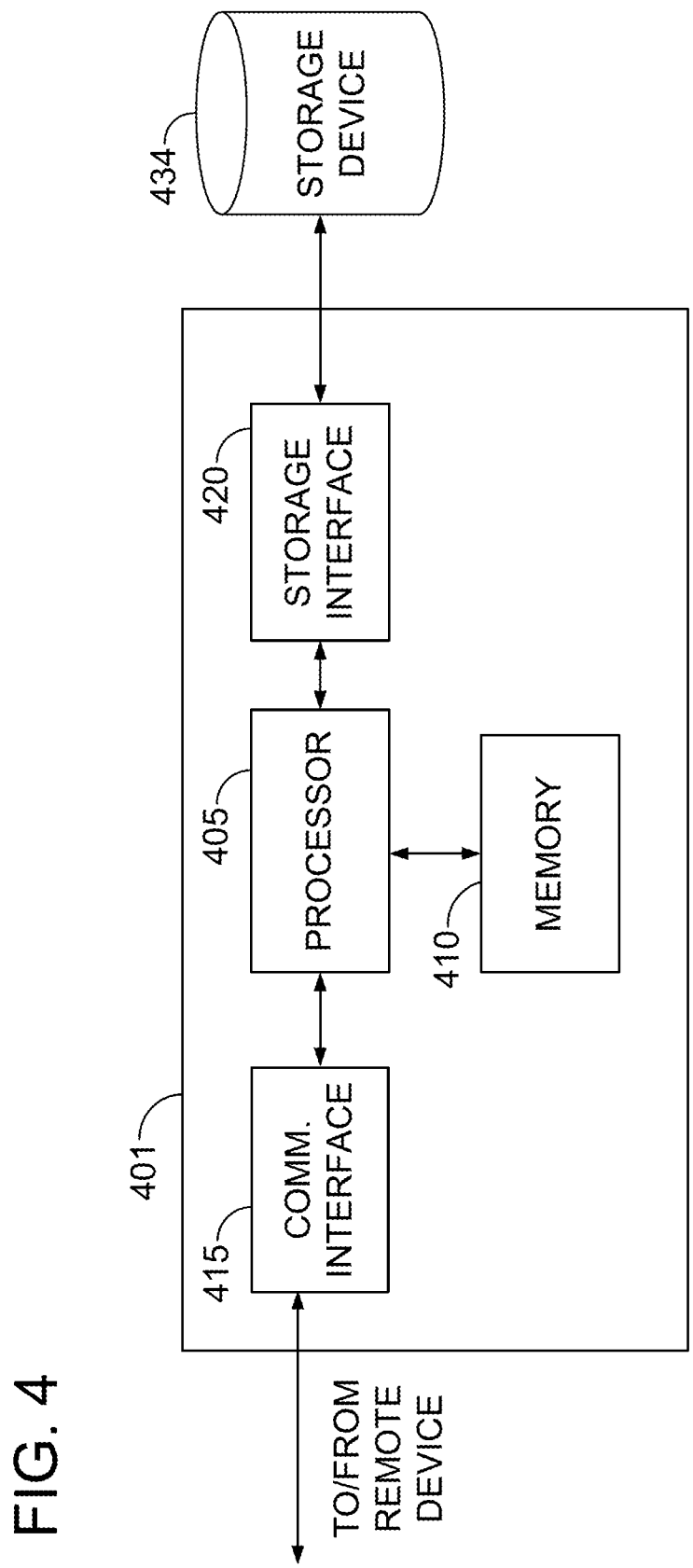

FIG. 4 illustrates an example configuration of a server system 401 such as the server system 212 (shown in FIG. 2) that includes TI computing device 250 (shown in FIG. 2). Server system 401 may include, but is not limited to, database server 216 (shown in FIG. 2) or TI computing device 250. In some embodiments, server system 401 is similar to server system 212.

Server system 401 includes a processor 405 for executing instructions. Instructions may be stored in a memory area 410, for example. Processor 405 may include one or more processing units (e.g., in a multi-core configuration) for executing instructions. The instructions may be executed within a variety of different operating systems on the server system 401, such as UNIX, LINUX, Microsoft Windows®, etc. More specifically, the instructions may cause various data manipulations on data stored in storage 434 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 405 is operatively coupled to a communication interface 415 such that server system 401 is capable of communicating with a remote device, such as a user system or another server system 401. For example, communication interface 415 may receive communications from issuer computing devices 130 via the Internet, as illustrated in FIG. 2.

Processor 405 may also be operatively coupled to a storage device 434. Storage device 434 is any computer-operated hardware suitable for storing and/or retrieving data. In some embodiments, storage device 434 is integrated in server system 401. In other embodiments, storage device 434 is external to server system 401 and is similar to database 220 (shown in FIG. 2). For example, server system 401 may include one or more hard disk drives as storage device 434. In other embodiments, storage device 434 is external to server system 401 and may be accessed by a plurality of server systems 401. For example, storage device 434 may include multiple storage units such as hard disks or solid state disks in a redundant array of inexpensive disks (RAID) configuration. Storage device 434 may include a storage area network (SAN) and/or a network attached storage (NAS) system.

In some embodiments, processor 405 is operatively coupled to storage device 434 via a storage interface 420. Storage interface 420 is any component capable of providing processor 405 with access to storage device 434. Storage interface 420 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 405 with access to storage device 434.

Memory area 410 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 5:
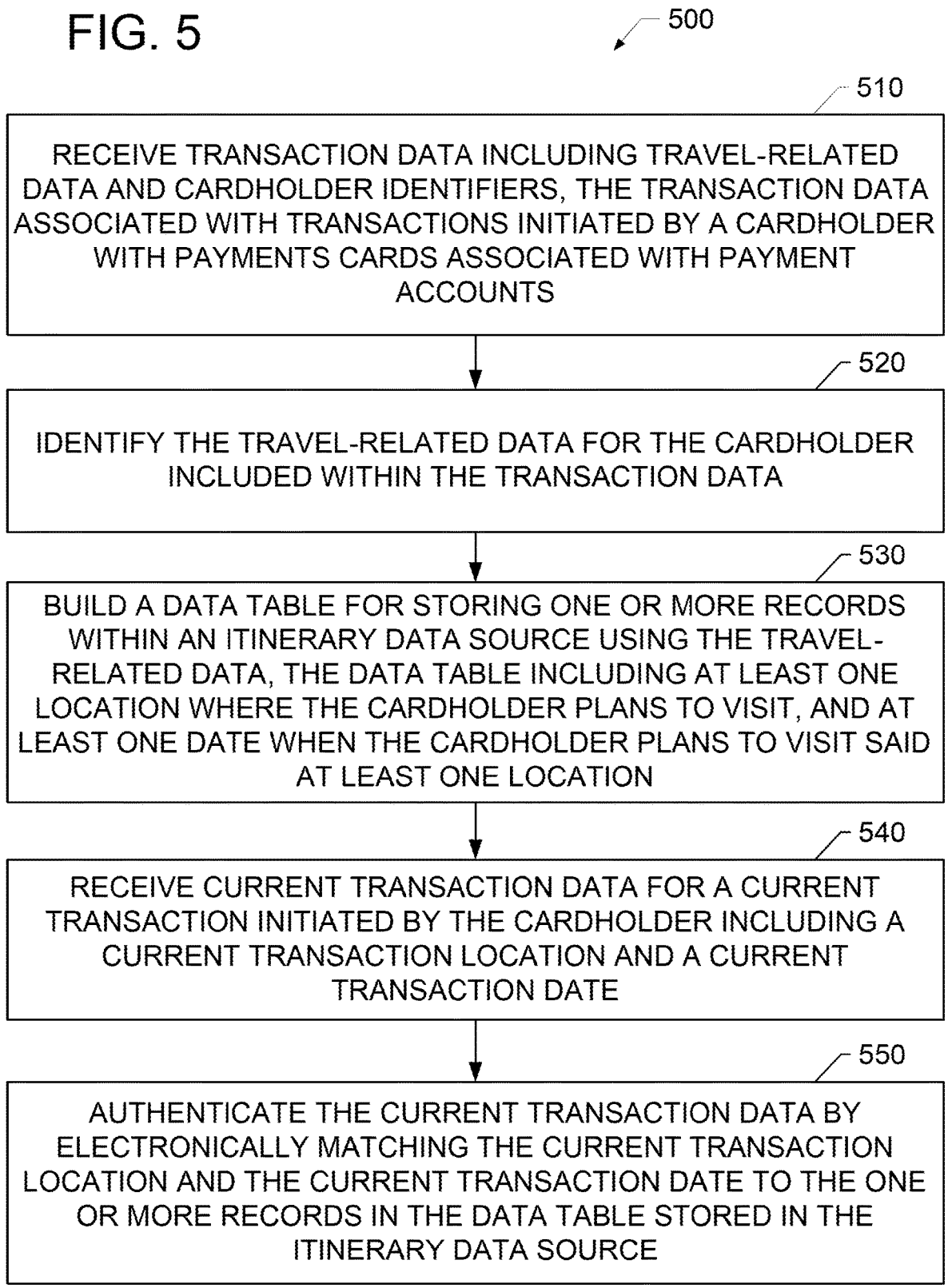

FIG. 5 is an example flow diagram illustrating a method flow by which TI computing device 250 (shown in FIG. 2) identifies travel-related data from transaction data initiated by cardholder 122 (shown in FIG. 2) for building a data table of travel-related data and using the data table to reduce false declines when processing payment transactions. In the example embodiment, TI computing device 250 receives 510 transaction data from merchant computing device 124 (shown in FIG. 2). The transaction data includes travel-related data and cardholder identifiers. The transaction data is associated with transactions initiated by cardholder 122 with payment cards associated with payment accounts. TI computing device 250 also identifies 520 the travel-related data for cardholder 122 included within the transaction data. Subsequently, TI computing device 250 builds 530 a data table for storing one or more records within an itinerary data source (e.g., a payment processor database) using the travel-related data The data table includes at least one location where cardholder 122 plans to visit, and at least one date when cardholder 122 plans to visit said at least one location. TI computing device 250 also receives 540 current transaction data for a current transaction initiated by cardholder 122 including a current transaction location and a current transaction date, and authenticates 550 the current transaction data by electronically matching the current transaction location and the current transaction date to the one or more records in the data table stored in the itinerary data source.

At the time cardholder 122 initiates a transaction, merchant computing device 124 (shown in FIG. 2) creates transaction data. After transaction data is created, TI computing device 250 receives 510 such data, which may include travel-related data and cardholder identifiers. The transaction data is associated with transactions initiated by cardholder 122 with payment cards associated with payment accounts. In some embodiments, travel data may be part of the addendum data. For example, travel-related data may be itinerary information, such as flight numbers, travel dates, destination and departure locations, and the like. In another example, travel-related data may be venue locations (e.g., museums), car reservation information, tour reservation information, and the like.

Subsequently, TI computing device 250 identifies 520 the travel-related data for cardholder 122 included in the transaction data. The TI computing device 250 may parse the transaction file and perform a lookup in order to identify the travel-related data. In some embodiments, TI computing device 250 may determine that transaction data includes travel-related data if the merchant is a travel agent, airline, hotel, and the like. In other embodiments, TI computing device 250 may determine that transaction data includes travel-related data by identifying the type of good or service purchased. For example, TI computing device 250 may identify a purchase of train tickets, venue tickets, concierge services, insurance travel, and the like, as travel-related data.

Once TI computing device 250 identifies the travel-related data, TI computing device 250 builds 530 a data table for storing one or more records within an itinerary data source (e.g., database 220 as illustrated in FIG. 2) using the travel-related data. The data table includes at least one location where cardholder 122 plans to visit, and at least one date when cardholder 122 plans to visit said at least one location. In some embodiments, TI computing device 250 may build the data table with travel-related data that includes travel dates, flight number, airline identifier, airline reservation number, hotel identifier, destination location, departure location, and the like. In other embodiments, TI computing device 250 may build the data table with only travel-related that includes destination location and travel dates. In some embodiments, TI computing device 250 may receive travel-related data in multiple transactions that may be related. For example, TI computing device 250 may receive two separate transactions related to the same itinerary. The first transaction may be a flight reservation from Atlanta, Ga., to London, England. The second transaction may be a train reservation from London, England, to Paris, France. Additionally, the arrival date of the first transaction may coincide with the departure date of the second transaction. The first transaction, when viewed independently of the second transaction, may indicate England is the destination the cardholder is traveling to. In this example, TI computing device 250 compares itinerary dates of each transaction to determine, as described below, whether the transaction are connected.

TI computing device 250 may build the data table by comparing the travel-related data with one or more records in the data table, determining the travel-related data includes at least one portion of data that matches at least one portion of the records in the data table, and concatenating the travel-related data to the matched records in the data table. Continuing with the above example, TI computing device 250 may determine that Paris may be recorded as the arrival location, London as an intermediate location, and Atlanta as a departure location. Subsequently, TI computing device 250 may update the data table to reflect the type of location for each city.

In certain embodiments, the records in the data table are available to other computing devices, such as issuer and/or merchant computing devices. TI computing device 250 may be in communication with issuer computing device 130. TI computing device 250 may transmit to issuer computing device 130 that cardholder 122 may be traveling to a particular location. Issuer computing device may receive said transmission and approve transactions associated with cardholder 122. Such transactions may be received from a merchant computing device that may be located in a different region from where cardholder 122 usually performs transactions.

TI computing device 250 also receives 540 current transaction data for a current transaction initiated by cardholder 122. The current transaction data includes a current transaction location and a current transaction date. TI computing device 250 electronically matches the current transaction location and the current transaction date to the records in the data table in order to authenticate 550 the current transaction data. After authenticating the transaction data, TI computing device may send an authentication message to issuer 130 for authorizing the transaction.

In some embodiments, issuer computing may submit a query to TI computing device 250 requesting data records of cardholder 122 itinerary for determining if a transaction is fraudulent. The query may include the identifier corresponding to cardholder 122 and a merchant location. After TI computing device 250 receives the query, it retrieves, from the itinerary data source, a data table associated with the identifier corresponding to cardholder 122. Then, TI computing device 250 may compare the merchant location, from the query, to locations stored in the data table. For example, cardholder 122 may have made a car reservation at the Los Angeles airport and a hotel reservation in San Diego for the same day. Because TI computing device 250 may aggregate both reservations and determine that cardholder 122 will drive from Los Angeles to San Diego and sleep in San Diego, TI computing device 250 may use the time and location of both reservations to compare them to transactions cardholder 122 may perform while cardholder 122 may be in Los Angeles, on the way to San Diego, and/or San Diego.

After comparing the records in the data table to the current transaction data, TI computing device 250 may determine the current transaction data includes at least a portion of data that matches at least one portion of the records in the data table. In the example above, cardholder 122 may purchase an ice cream in Pacific Beach. Even though Pacific Beach is not in San Diego or Los Angeles, it is on the way from Los Angeles to San Diego. Thus, TI computing device 250 may determine that a portion of the ice cream transaction (e.g., merchant location) matches a portion of the records in the data table, the combination of the location of the car reservation and the hotel reservation. Then, TI computing device 250 may send an authentication message to issuer 130 for authorizing the transaction.

Figure 6:
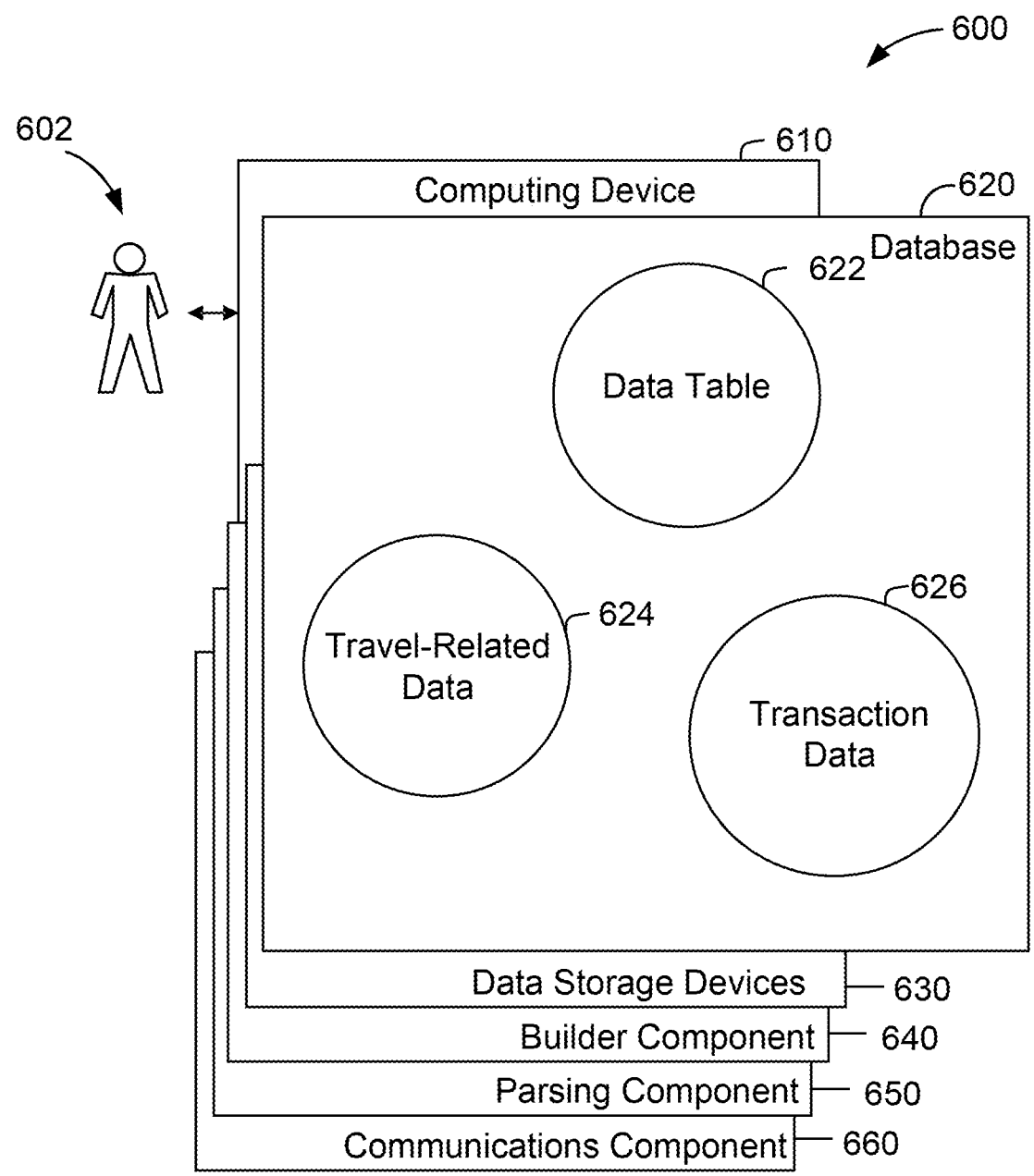

FIG. 6 shows an example configuration of a database 600 within a computing device, along with other related computing components, that may be used to identifying travel-related data from transaction data initiated by cardholder 122 (shown in FIG. 2) for building a data table based on travel-related data (e.g., itinerary information) and using such data table to reduce false declined transactions. In some embodiments, computing device 610 is similar to server system 212 (shown in FIG. 2). User 602 (such as a user operating server system 212) may access computing device 610 in order to verify records in the data table corresponding to cardholder 122. In some embodiments, database 620 is similar to database 220 (shown in FIG. 2). In the example embodiment, database 620 includes data table 622, travel-related data 624, and transaction data 262. Data table 622 may include cardholder 122 personal data (e.g., address, city, state, zip or postal code, country, account information, such as account identifier), cardholder 122 computing device data (e.g., IP address data, MAC address data), and cardholder 122 itinerary data (e.g., itinerary information, such as travel dates, departure and arrival locations).

Travel-related data 624 may include cardholder personal data (e.g., address, city, state, zip or postal code, country, telephone number, account information, such as account identifier), merchant data (e.g., merchant location, merchant identifier, merchant type), and travel data (e.g., addendum data, such as travel dates, origin location, destination location, and other travel itinerary information). Transaction data 626 may include transaction amounts, transaction dates/times, account data related to the payment card used to perform the transaction (e.g., primary account number associated with payment card, card expiration date, card issuer, card security code, and the like), merchant identifiers, stock-keeping unit (SKU) data relating to the goods or services purchased by cardholder 122, addendum data, and the like.

Computing device 610 also includes data storage devices 630. Computing device 610 also includes builder component 640 that builds a data table based on the travel-related data from transaction data associated with cardholder 122. Builder component 640 may also perform, for example, identifying 520 (shown in FIG. 5) travel-data from transaction data, building 530 (shown in FIG. 5) a data table for storing one or more records within an itinerary data source, receiving 540 (shown in FIG. 5) current transaction data including a current transaction location and a current transaction date, and/or authenticating 550 (shown in FIG. 5) the current transaction data by electronically matching the current transaction location and the current transaction date to the records in data table 622. Computing device 610 also includes parsing component 650 that facilitates parsing data. Computing device 610 also includes communications component 660 which is used to communicate with issuer computing devices, merchant computing devices, and/or other computing devices using predefined network protocols such as TCP/IP (Transmission Control Protocol/Internet Protocol) over the Internet.

Figure 7:
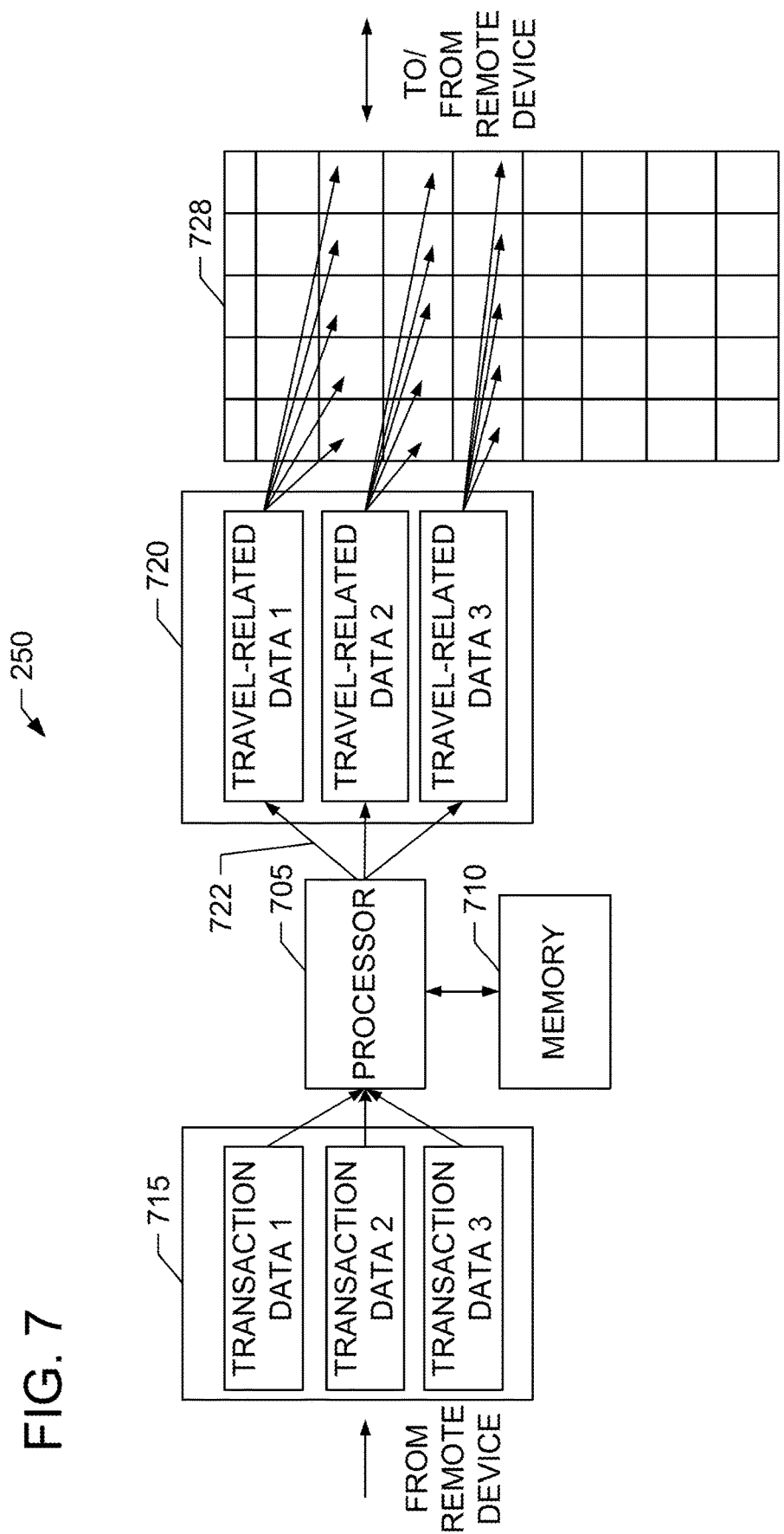

FIG. 7 illustrates an example configuration of a travel identifier (TI) computing device 250 (shown in FIG. 2) configured to parse transaction data, identify travel-related data, build a data table, receive current transaction data, and authenticate the current transaction data. TI computing device 250 may include, but is not limited to, processor 705 for executing instructions. In some embodiments, processor 705 is similar to processor 405 (shown in FIG. 4). In the example embodiment, TI computing device 250 includes executable instructions are stored in a memory area 710. Processor 705 may include one or more processing units, for example, a multi-core configuration. Memory area 710 is any device allowing information such as executable instructions and/or written works to be stored and retrieved. Memory area 710 may include one or more computer readable media.

TI computing device 250 includes a processor 705 for executing instructions. Instructions may be stored in a memory area 710, for example. Processor 705 may include one or more processing units (e.g., in a multi-core configuration) for executing instructions. The instructions may be executed within a variety of different operating systems on the computing device 250, such as UNIX, LINUX, Microsoft Windows®, etc. More specifically, the instructions may cause various data manipulations on itinerary data source 728 (e.g., create, read, update, and delete data). It should also be appreciated that upon initiation of a computer-based method, various instructions may be executed during initialization. Some operations may be required in order to perform one or more processes described herein, while other operations may be more general and/or specific to a particular programming language (e.g., C, C #, C++, Java, or other suitable programming languages, etc.).

Processor 705 is operatively coupled to a communication interface 715 such that TI computing device 250 is capable of communicating with a remote device, such as payment network 210 (shown in FIG. 2). For example, communication interface 715 may receive communications from issuer computing devices 130 via the Internet, as illustrated in FIG. 2.

Processor 705 may also be operatively coupled to a storage device 720. Storage device 720 is any computer-operated hardware suitable for storing and/or retrieving data. In some embodiments, storage device 720 is integrated in TI computing device 250. In other embodiments, storage device 720 is external to TI computing device 250 and is similar to database 420 (shown in FIG. 4). For example, TI computing device 250 may include one or more hard disk drives as storage device 434. In other embodiments, storage device 720 is external to TI computing device 250 and may be accessed by a plurality of TI computing devices 250. For example, storage device 720 may include multiple storage units such as hard disks or solid state disks in a redundant array of inexpensive disks (RAID) configuration. Storage device 720 may include a storage area network (SAN) and/or a network attached storage (NAS) system.

In some embodiments, processor 705 is operatively coupled to storage device 720 via a storage interface 722. Storage interface 722 is any component capable of providing processor 705 with access to storage device 720. Storage interface 722 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 705 with access to storage device 720.

In certain embodiments, processor 705 is configured to instruct TI computing device 250 to parse transaction data from communication interface 715, identify a cardholder identifier and travel-related data from the transaction data, store travel-related data in storage device 720 based on the cardholder identifier, and build data table 728 of travel-related data based on the cardholder identifier. In other embodiments, processor 705 is configured to instruct TI computing device 250 to parse current transaction data, identify current transaction location and current transaction date associated with a current transaction data. The current transaction data associated with transactions initiated by cardholder 122. Processor 705 is also configured to instruct TI computing device 250 to compare the current transaction location and the current transaction date to the records in data table 728, and further determine that the current transaction location and the current transaction date match the records in data table 728.

In yet other embodiments, a remote device may query TI computing device 250 to verify a transaction is not fraudulent. The remote device may include in a query a cardholder identifier, location, and date of a transaction performed by cardholder 122. TI computing device may compare, based on the cardholder identifier, such location and date to records in data table 728. Subsequently, TI computing device 250 may determine, based on the cardholder identifier, that the location and date of the transaction matches records in data table 728 corresponding to the cardholder identifier.

In alternative embodiments, TI computing device 250 may prune records from data table 728, including removing records from the data table containing outdated and/or cancelled travel-related data. Transactions that have been refunded and/or cancelled may be identified by additional received transaction data indicating the original transaction was refunded and/or cancelled. For example, a second transaction may be received with a negative amount from a merchant, and further the transaction amount may be opposite to a first transaction with the same merchant. In this example, the second transaction may be identified as a refund of the first transaction, indicating the travel-related data associated with the first transaction should be removed from data table 728. In another example, TI computing device 250 may receive transaction data including a status code indicating another transaction identified in the message has been cancelled and should be removed from data table. TI computing device 250 may prune data table 728 periodically. Additionally or alternatively, TI computing device 250 may be configured to maintain current records in data table 728. For example, TI computing device 250 may periodically (e.g., in a daily basis) parse data table 728 to identify outdated records. These records may be in general travel-related data associated with dates that have passed.

Memory area 710 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

As will be appreciated based on the foregoing specification, the above-described embodiments of the disclosure may be implemented using computer programming or engineering techniques including computer software, firmware, hardware or any combination or subset thereof, wherein the technical effect is to collect digital wallet data from a digital wallet transaction initiated by a user for determining the user's demographics. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for building a data table of travel-related data and using the data table to reduce false declines when processing payment transactions, the system comprising:
    a travel identifier (TI) computing device in communication with a memory, the TI computing device configured to:
    receive, from a payment processing network, first transaction data extracted from a plurality of authorization request messages corresponding to a plurality of payment transactions being processed over the payment processing network, the first transaction data including cardholder identifiers, and at least one of the plurality of payment transactions initiated by a cardholder using one or more payment cards each associated with one or more payment accounts, wherein the cardholder is associated with one of the cardholder identifiers;
    filter the first transaction data to identify first travel-related data for the cardholder included within the first transaction data, wherein the first travel-related data include at least a first location and a first date associated with the first location, and wherein the first location represents a first destination to be visited on the first date;
    build a data table for storing one or more records within an itinerary data source using the first travel-related data, each record of the one or more records including an intermediate location field, an intermediate date field, a destination location field, and a destination date field;
    add a first record to the data table by populating the intermediate location field with the first location and the intermediate date field with the first date;
    receive second transaction data including one of the cardholder identifiers associated with the cardholder;
    filter the second transaction data to identify second travel-related data for the cardholder, wherein the second travel-related data include a second location and a second date associated with the second location and wherein the second location represents a second destination to be visited on the second date;
    determine that the second date is within a range of dates after the first date;
    add, in response to the determining, to the first record, in the data table, the second location and the second date by populating the destination location field with the second location and the destination date field with the second date;
    receive, in an authorization request submitted via the payment processing network, current transaction data for a current transaction initiated by the cardholder, the current transaction data including one of the cardholder identifiers associated with the cardholder, a current transaction location, and a current transaction date;
    query the data table for records associated with the cardholder, wherein the query returns at least the first record;
    determine, based on data included in the first record, that the current transaction date is one of the first date, the second date, and a date in between the first date and the second date;
    in response to determining that the current transaction date is one of the first date, the second date, and a date in between the first date and the second date, determine, based on data included in the first record, that the current transaction location is within at least one of (i) a first predetermined distance from the first location representing the first destination and (ii) a second predetermined distance from the second location representing the second destination; and
    authenticate the current transaction data in response to determining that that the current transaction location is within the at least one of (i) the first predetermined distance from the first location and (ii) the second predetermined distance from the second location, thereby indicating that the current transaction is not fraudulent.

2. The system of claim 1, wherein each of the first and second travel-related data is addendum data that is received by the TI computing device as part of an ISO 8583 clearing message, the addendum data including travel location data and travel date data for purchases of travel-related items made by the cardholder.

3. The system of claim 2, wherein the TI computing device is further configured to:
    parse the addendum data received as part of the ISO 8583 clearing message;
    perform a lookup in the data table for one or more records that match the addendum data;
    determine the addendum data includes at least one portion of data that matches at least one portion of the one or more records in the data table; and
    concatenate, in the data table, the addendum data to the matched one or more records.

4. The system of claim 1, wherein the TI computing device is further configured to:

identify negative transaction amounts and positive transaction amounts; and
remove one or more records from the data table that match
i) the negative transaction amounts absolute value and
ii) addendum data associated with the negative transaction amounts.

5. The system of claim 1, wherein the TI computing device is further configured to perform a lookup for one or more records including dates that have passed and remove said records from the data table.

6. The system of claim 1, wherein the TI computing device is further configured to:
receive a query, via the Internet from a risk analyzing party, containing the cardholder identifier corresponding to the cardholder and at least one date and one location, the received query to determine whether another transaction initiated by the cardholder is fraudulent, the risk analyzing party being one of a merchant and an issuer bank;
retrieve the data table from the itinerary data source, the data table including one or more records associating the cardholder identifier corresponding to the cardholder with the at least one date and one location;
compare one or more records in the data table to the query;
determine the query includes at least a portion of data that matches at least one portion of the records in the data table;
generate a response based on the determination, the response indicating whether the another transaction is fraudulent; and
transmit the response to the risk analyzing party including one or more records from the data table associating the cardholder identifier corresponding to the cardholder with the at least one date and one location.

7. The system of claim 1, wherein the TI computing device is further configured to:
receive, from an issuer bank, at least one restriction rule assigned to the one or more payment accounts of the cardholder including one or more geographic restriction rules restricting use of payment to a specific geographic area;
store the at least one restriction rule in the memory;
apply the at least one restriction rule to the current transaction data; and
determine that the current transaction location is outside the specific geographic area of the one or more geographic restriction rules; and
over-ride the at least one restriction rule after determining that the current transaction location and the current transaction date match the data table stored in the itinerary data source by sending an authentication message to the issuer bank for authorizing the current transaction.

8. A computer-implemented method for building a data table of travel-related data and using the data table to reduce false declines when processing payment transactions, the method implemented using a travel identifier (TI) computing device in communication with a memory, the method comprising:
receiving, from a payment processing network, first transaction data extracted from a plurality of authorization request messages corresponding to a plurality of payment transactions being processed over the payment processing network, the first transaction data including cardholder identifiers, and at least one of the plurality of payment transactions initiated by a cardholder using one or more payment cards each associated with one or more payment accounts, wherein the cardholder is associated with one of the cardholder identifiers;
filtering the first transaction data to identify first travel-related data for the cardholder included within the first transaction data, wherein the first travel-related data include at least a first location and a first date associated with the first location, and wherein the first location represents a first destination to be visited on the first date;
building a data table for storing one or more records within an itinerary data source using the first travel-related data, each record of the one or more records including an intermediate location field, an intermediate date field, a destination location field, and a destination date field;
adding a first record to the data table by populating the intermediate location field with the first location and the intermediate date field with the first date;
receiving second transaction data including one of the cardholder identifiers associated with the cardholder;
filtering the second transaction data to identify second travel-related data for the cardholder, wherein the second travel-related data include a second location and a second date associated with the second location, and wherein the second location represents a second destination to be visited on the second date;
determining that the second date is within a range of dates after the first date;
adding, in response to the determining, to the first record, in the data table, the second location and the second date by populating the destination location field with the second location and the destination date field with the second date;
receiving, in an authorization request submitted via the payment processing network, current transaction data for a current transaction initiated by the cardholder, the current transaction data including one of the cardholder identifiers associated with the cardholder, a current transaction location, and a current transaction date;
querying the data table for records associated with the cardholder, wherein the query returns at least the first record;
determining, based on data included in the first record, that the current transaction date is one of the first date, the second date, and a date in between the first date and the second date;
in response to determining that the current transaction date is one of the first date, the second date, and a date in between the first date and the second date, determining, based on data included in the first record, that the current transaction location is within at least one of (i) a first predetermined distance from the first location representing the first destination and (ii) a second predetermined distance from the second location representing the second destination; and
authenticating the current transaction data in response to determining that that the current transaction location is within the at least one of (i) the first predetermined distance from the first location and (ii) the second predetermined distance from the second location, thereby indicating that the current transaction is not fraudulent.

9. The method of claim 8, wherein each of the first and second travel-related data is addendum data that is received by the TI computing device as part of an ISO 8583 clearing message, the addendum data including travel location data and travel date data for purchases of travel-related items made by the cardholder.

10. The method of claim 9 further comprising:
   parsing the addendum data received as part of the ISO 8583 clearing message;
   performing a lookup in the data table for one or more records that match the addendum data;
   determining the addendum data includes at least one portion of data that matches at least one portion of the one or more records in the data table; and
   concatenating, in the data table, the addendum data to the matched one or more records.

11. The method of claim 8 further comprising:
   identifying negative transaction amounts and positive transaction amounts; and
   removing one or more records from the data table that match i) the negative transaction amounts absolute value and ii) addendum data associated with the negative transaction amounts.

12. The method of claim 8 further comprising performing a lookup for one or more records including dates that have passed and remove said records from the data table.

13. The method of claim 8 further comprising:
   receiving a query, via the Internet from a risk analyzing party, containing the cardholder identifier corresponding to the cardholder and at least one date and one location, the received query to determine whether another transaction initiated by the cardholder is fraudulent, the risk analyzing party being one of a merchant and an issuer bank;
   retrieving the data table from the itinerary data source, the data table including one or more records associating the cardholder identifier corresponding to the cardholder with the at least one date and one location;
   comparing one or more records in the data table to the query;
   determining the query includes at least a portion of data that matches at least one portion of the records in the data table;
   generating a response based on the determination, the response indicating whether the another transaction is fraudulent; and
   transmitting the response to the risk analyzing party including one or more records from the data table associating the cardholder identifier corresponding to the cardholder with the at least one date and one location.

14. The method of claim 8 further comprising:
   receiving, from an issuer bank, at least one restriction rule assigned to the one or more payment accounts of the cardholder including one or more geographic restriction rules restricting use of payment to a specific geographic area;
   storing the at least one restriction rule in the memory;
   applying the at least one restriction rule to the current transaction data; and
   determining that the current transaction location is outside the specific geographic area of the one or more geographic restriction rules; and
   over-riding the at least one restriction rule after determining that the current transaction location and the current transaction date match the data table stored in the itinerary data source by sending an authentication message to the issuer bank for authorizing the current transaction.

15. A non-transitory computer readable medium that includes computer-executable instructions for managing access to data stored within a data source, wherein when executed by a travel identifier (TI) computing device comprising at least one processor in communication with at least one memory device, the computer-executable instructions cause the TI computing device to:
   receive, from a payment processing network, first transaction data extracted from a plurality of authorization request messages corresponding to a plurality of payment transactions being processed over the payment processing network, the first transaction data including cardholder identifiers, and at least one of the plurality of payment transactions initiated by a cardholder using one or more payment cards each associated with one or more payment accounts, wherein the cardholder is associated with one of the cardholder identifiers;
   filter the first transaction data to identify first travel-related data for the cardholder included within the first transaction data, wherein the first travel-related data include at least a first location and a first date associated with the first location, and wherein the first location represents a first destination to be visited on the first date;
   build a data table for storing one or more records within an itinerary data source using the first travel-related data, each record of the one or more records including an intermediate location field, an intermediate date field, a destination location field, and a destination date field;
   add a first record to the data table by populating the intermediate location field with the first location and the intermediate date field with the first date;
   receive second transaction data including one of the cardholder identifiers associated with the cardholder;
   filter the second transaction data to identify second travel-related data for the cardholder, wherein the second travel-related data include a second location and a second date associated with the second location, and wherein the second location represents a second destination to be visited on the second date;
   determine that the second date is within a range of dates after the first date;
   add, in response to the determining, to the first record, in the data table, the second location and the second date by populating the destination location field with the second location and the destination date field with the second date;
   receive, in an authorization request submitted via the payment processing network, current transaction data for a current transaction initiated by the cardholder, the current transaction data including one of the cardholder identifiers associated with the cardholder, a current transaction location, and a current transaction date;
   query the data table for records associated with the cardholder, wherein the query returns at least the first record;
   determine, based on data included in the first record, that the current transaction date is one of the first date, the second date, and a date in between the first date and the second date;
   in response to determining that the current transaction date is one of the first date, the second date, and a date in between the first date and the second date, determine, based on data included in the first record, that the current transaction location is within at least one of (i) a first predetermined distance from the first location representing the first destination and (ii) a second predetermined distance from the second location representing the second destination; and authenticate the current transaction data in response to determining that that the current transaction location is within the at least one of (i) the first predetermined distance from the first location and (ii) the second predetermined distance from the second location, thereby indicating that the current transaction is not fraudulent.

16. The computer readable medium of claim 15, wherein each of the first and second travel-related data is addendum data that is received by the TI computing device as part of an ISO 8583 clearing message, the addendum data including travel location data and travel date data for purchases of travel-related items made by the cardholder.

17. The computer readable medium of claim 16, wherein the computer-executable instructions further cause the TI computing device to:
    parse the addendum data received as part of the ISO 8583 clearing message;
    perform a lookup in the data table for one or more records that match the addendum data;
    determine the addendum data includes at least one portion of data that matches at least one portion of the one or more records in the data table; and
    concatenate, in the data table, the addendum data to the matched one or more records.

18. The computer readable medium of claim 15, wherein the computer-executable instructions further cause the TI computing device to:
    identify negative transaction amounts and positive transaction amounts; and
    remove one or more records from the data table that match
        i) the negative transaction amounts absolute value and
        ii) addendum data associated with the negative transaction amounts.

19. The computer readable medium of claim 15, wherein the computer-executable instructions further cause the TI computing device to perform a lookup for one or more records including dates that have passed and remove said records from the data table.

20. The computer readable medium of claim 15, wherein the computer-executable instructions further cause the TI computing device to:

receive a query, via the Internet from a risk analyzing party, containing the cardholder identifier corresponding to the cardholder and at least one date and one location, the received query to determine whether another transaction initiated by the cardholder is fraudulent, the risk analyzing party being one of a merchant and an issuer bank;

retrieve the data table from the itinerary data source, the data table including one or more records associating the cardholder identifier corresponding to the cardholder with the at least one date and one location;

compare one or more records in the data table to the query;

determine the query includes at least a portion of data that matches at least one portion of the records in the data table;

generate a response based on the determination, the response indicating whether the another transaction is fraudulent; and transmit the response to the risk analyzing party including one or more records from the data table associating the cardholder identifier corresponding to the cardholder with the at least one date and one location.

21. The computer readable medium of claim 15, wherein the computer-executable instructions further cause the TI computing device to:
    receive, from an issuer bank, at least one restriction rule assigned to the one or more payment accounts of the cardholder including one or more geographic restriction rules restricting use of payment to a specific geographic area;
    store the at least one restriction rule in the at least one memory device;
    apply the at least one restriction rule to the current transaction data; and
    determine that the current transaction location is outside the specific geographic area of the one or more geographic restriction rules; and
    over-ride the at least one restriction rule after determining that the current transaction location and the current transaction date match the data table stored in the itinerary data source by sending an authentication message to the issuer bank for authorizing the current transaction.

* * * * *